US009787951B2

(12) United States Patent
Kannon et al.

(10) Patent No.: US 9,787,951 B2
(45) Date of Patent: Oct. 10, 2017

(54) VEHICLE PROXIMITY WARNING SYSTEM

(71) Applicants: Serge Kannon, Brooklyn, NY (US); Avraham Zaken, Encino, CA (US)

(72) Inventors: Serge Kannon, Brooklyn, NY (US); Avraham Zaken, Encino, CA (US)

( * ) Notice: Subject to any disclaimer, the term of this patent is extended or adjusted under 35 U.S.C. 154(b) by 186 days.

(21) Appl. No.: 14/974,829

(22) Filed: Dec. 18, 2015

(65) Prior Publication Data

US 2017/0178512 A1 Jun. 22, 2017

(51) Int. Cl.
| | |
|---|---|
| *H04N 7/00* | (2011.01) |
| *H04N 7/18* | (2006.01) |
| *B60R 1/00* | (2006.01) |
| *B60Q 1/26* | (2006.01) |
| *B60Q 1/52* | (2006.01) |
| *B60Q 5/00* | (2006.01) |

(Continued)

(52) U.S. Cl.
CPC .......... *H04N 7/188* (2013.01); *B60Q 1/2696* (2013.01); *B60Q 1/525* (2013.01); *B60Q 5/006* (2013.01); *B60R 1/00* (2013.01); *G07C 5/08* (2013.01); *G08G 1/166* (2013.01); *G08G 1/168* (2013.01); *H04N 7/185* (2013.01)

(58) Field of Classification Search
CPC .......... G06T 3/4038; E02F 9/24; E02F 9/261; B60R 1/00; B60R 2300/301; B60R 2300/70
See application file for complete search history.

(56) References Cited

U.S. PATENT DOCUMENTS

| | | | |
|---|---|---|---|
| 5,012,222 A | 4/1991 | Gavrilis | |
| 5,173,881 A | 12/1992 | Sindle | |

(Continued)

FOREIGN PATENT DOCUMENTS

| | | |
|---|---|---|
| EP | 2755193 | 7/2014 |
| JP | 2009166737 | 7/2009 |
| WO | WO2005022193 | 3/2005 |

OTHER PUBLICATIONS

Jack Loftus, Hit and Run Drivers Beware, the Car Camera Voyager Pro Is Always Watching, Brickhouse Security's Car Camera Voyager Pro, Brickhouse Security via Engadget, Jul. 20, 2008, One, http://gizmodo.com/5027046/hit-and-run-drivers-beware-the-car-came . . . .

*Primary Examiner* — Frank Huang
(74) *Attorney, Agent, or Firm* — Goldstein Law Offices, P.C.

(57) ABSTRACT

A vehicle proximity warning system, installed in a primary vehicle having a front, a rear, a front bumper, a rear bumper, a horn, a front windshield, and a rear window, and an associated smartphone. Sensor bars are mounted near the front and rear bumpers for determining a proximity distance of a secondary vehicle as it approaches, each sensor bar having an accelerometer and a camera for detecting a collision with the secondary vehicle and acquiring images thereof that are wirelessly shared with the smartphone. Indicator bars are located in the front windshield and rear window and each have indicator LEDs that are successively illuminated as the proximity distance decreases, to provide a visual indication that can be seen by the secondary vehicle. When the proximity distance falls below a predetermined danger threshold, the system sounds the horn, flashes the indicator LEDs, and activates the camera.

10 Claims, 9 Drawing Sheets

(51) Int. Cl.
*G08G 1/16* (2006.01)
*G07C 5/08* (2006.01)

(56) References Cited

U.S. PATENT DOCUMENTS

| | | | |
|---|---|---|---|
| 5,334,969 A | 8/1994 | Abe et al. | |
| 5,893,582 A * | 4/1999 | Allen | B60N 2/002 280/730.1 |
| 5,970,162 A * | 10/1999 | Kawashima | H04N 7/142 348/14.05 |
| 6,118,480 A * | 9/2000 | Anderson | H04N 1/32128 348/207.99 |
| 6,184,781 B1 * | 2/2001 | Ramakesavan | B60Q 1/52 340/435 |
| 6,339,369 B1 | 1/2002 | Paranjpe | |
| 6,411,204 B1 * | 6/2002 | Bloomfield | B60Q 1/302 340/464 |
| 6,696,931 B2 | 2/2004 | Paranjpe | |
| 7,061,401 B2 * | 6/2006 | Voos | G08G 5/0013 340/961 |
| 7,103,545 B2 * | 9/2006 | Furuta | E02F 9/20 704/246 |
| 7,375,627 B2 | 5/2008 | Johnson et al. | |
| 7,403,101 B2 | 7/2008 | Kropinski et al. | |
| 7,466,337 B2 * | 12/2008 | Sawada | H04N 7/183 348/148 |
| 7,570,155 B2 | 8/2009 | Horii | |
| 7,596,281 B2 * | 9/2009 | Irani | G06T 7/20 382/276 |
| 7,640,107 B2 * | 12/2009 | Shimizu | B60K 35/00 340/932.2 |
| 7,640,108 B2 * | 12/2009 | Shimizu | B60K 35/00 180/204 |
| 7,675,563 B2 * | 3/2010 | Nakajima | H04N 1/32101 348/333.05 |
| 7,772,969 B2 * | 8/2010 | Prohaska | B62D 33/0633 180/326 |
| 7,963,448 B2 * | 6/2011 | Testa | G06K 7/10544 235/435 |
| 8,040,421 B2 * | 10/2011 | Suehiro | H04N 5/23238 348/208.1 |
| 8,094,204 B2 * | 1/2012 | Tsurumi | G06F 3/0486 348/208.1 |
| 8,315,789 B2 * | 11/2012 | Dunbabin | G05D 1/0274 340/436 |
| 8,332,106 B2 * | 12/2012 | Yuet | B65H 75/425 701/50 |
| 8,364,353 B2 * | 1/2013 | Kiegerl | E02F 1/00 700/245 |
| 8,428,790 B2 * | 4/2013 | Koch | E02F 9/2054 701/2 |
| 8,527,155 B2 * | 9/2013 | Gudat | E02F 9/2054 701/50 |
| 8,791,811 B2 | 7/2014 | Park | |
| 8,959,918 B2 * | 2/2015 | Nishikawa | E02F 9/123 180/65.21 |
| 8,994,519 B1 * | 3/2015 | Fuchs | G01C 21/3407 299/67 |
| 9,030,332 B2 * | 5/2015 | Tafazoli Bilandi | E02F 9/24 340/686.1 |
| 9,113,047 B2 * | 8/2015 | Onuma | E02F 9/24 |
| 9,332,229 B2 * | 5/2016 | Ishimoto | E02F 9/226 |
| 2003/0122930 A1 * | 7/2003 | Schofield | B60R 1/00 348/148 |
| 2003/0222793 A1 * | 12/2003 | Tanaka | B60Q 9/004 340/932.2 |
| 2005/0088522 A1 | 4/2005 | Creviston | |
| 2005/0231341 A1 * | 10/2005 | Shimizu | B60Q 9/005 340/436 |
| 2007/0164873 A1 * | 7/2007 | Yamada | E02F 9/26 340/679 |
| 2008/0079554 A1 | 4/2008 | Boice | |
| 2008/0231703 A1 * | 9/2008 | Nagata | H04N 7/181 348/148 |
| 2010/0118146 A1 * | 5/2010 | Schofield | B60R 1/00 348/148 |
| 2010/0220189 A1 * | 9/2010 | Yanagi | B60R 1/00 348/148 |
| 2010/0245577 A1 * | 9/2010 | Yamamoto | B60R 1/00 348/148 |
| 2011/0285848 A1 * | 11/2011 | Han | B60R 1/00 348/148 |
| 2012/0069153 A1 * | 3/2012 | Mochizuki | B60R 1/00 348/47 |
| 2012/0127312 A1 * | 5/2012 | Nagamine | B60R 1/00 348/148 |
| 2012/0286974 A1 | 11/2012 | Claussen et al. | |
| 2014/0118533 A1 * | 5/2014 | Chang | G06T 3/4038 348/118 |
| 2014/0197939 A1 | 7/2014 | Stefan et al. | |

\* cited by examiner

VEHICLE PROXIMITY WARNING SYSTEM

TECHNICAL FIELD

The present disclosure relates generally to a vehicle proximity warning system. More particularly, the present disclosure relates to a system installed in a primary vehicle that effectively warns the driver of a secondary vehicle of it's unacceptably close proximity to the primary vehicle, and captures and records such information for the owner of the primary vehicle.

BACKGROUND

People take great pride in the appearance of their automobiles. A brand new, pristine vehicle can be quite beautiful to own and behold.

Unfortunately, many vehicles cannot maintain this pristine appearance for long. And the vehicle's owner is often not at fault. Even minor collisions from other vehicles can create dents, dings, scratches, scuffs and paint chips. Perhaps the most common place where these imperfections collect is on the front and rear bumper.

In densely populated areas, street parking often creates close encounters between vehicles. Often parking spots are only a little bigger than the vehicles themselves, and require drivers to skillfully maneuver into the spot to avoid hitting the vehicle in front or behind the parking spot. In reality, not all drivers have the necessary skills and judgment—to the detriment of the owners of the cars they hit while they attempt to park!

Once there is a collision, and damage occurs, the owner typically has no recourse against the culprit. Unless someone witnesses the collision, there is little that can be done to redress the damage.

Various devices have been proposed which attempt to mitigate the damage to a vehicle's bumper from the careless driving of others. Such devices are unsightly, and their effectiveness requires that they cover and thus conceal the very parts whose appearance they protect!

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system that prevents low-speed parking collisions with a vehicle. Accordingly, the present disclosure provides a system that effectively warns drivers of secondary vehicles as they approach a primary vehicle, that they are getting too close. The system includes proximity sensors at the front and rear bumpers of the primary vehicle, and displays that are visible to the drivers of secondary vehicles that progressively indicate the decreasing distance between the vehicles.

It is another aspect of an example embodiment in the present disclosure to provide a system that captures and records data for the primary vehicle owner when another vehicle collides with the primary vehicle during parking. Accordingly, sensor bars at the front and rear bumpers each have a camera for capturing and recording images of an approaching and colliding vehicle, and an accelerometer for memorializing when a collision has taken place. Captured data may be communicated to the primary vehicle owner's smartphone via a short-range data communication scheme such as Bluetooth.

It is yet another aspect of an example embodiment in the present disclosure to provide a system that integrates seamlessly with normal operation of the vehicle without requiring vehicle intervention. Accordingly, the system may be connected to the electrical system of the primary vehicle to determine when the ignition is off, and to determine when the vehicle is in reverse, and then to automatically enter an appropriate operating mode. Thus, when the vehicle ignition is off, the sensor bars are active. When the vehicle ignition is on, the sensor bars are made active when the vehicle is placed in reverse, and for a short time thereafter, to assist the primary vehicle operator while parking.

Accordingly, the present disclosure describes a vehicle proximity warning system, installed in a primary vehicle having a front, a rear, a front bumper, a rear bumper, a horn, a front windshield, and a rear window, and an associated smartphone. Sensor bars are mounted near the front and rear bumpers for determining a proximity distance of a secondary vehicle as it approaches, each sensor bar having an accelerometer and a camera for detecting a collision with the secondary vehicle and acquiring images thereof that are wirelessly shared with the smartphone. Indicator bars are located in the front windshield and rear window and each have indicator LEDs that are successively illuminated as the proximity distance decreases, to provide a visual indication that can be seen by the secondary vehicle. When the proximity distance falls below a predetermined danger threshold, the system sounds the horn, flashes the indicator LEDs, and activates the camera.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
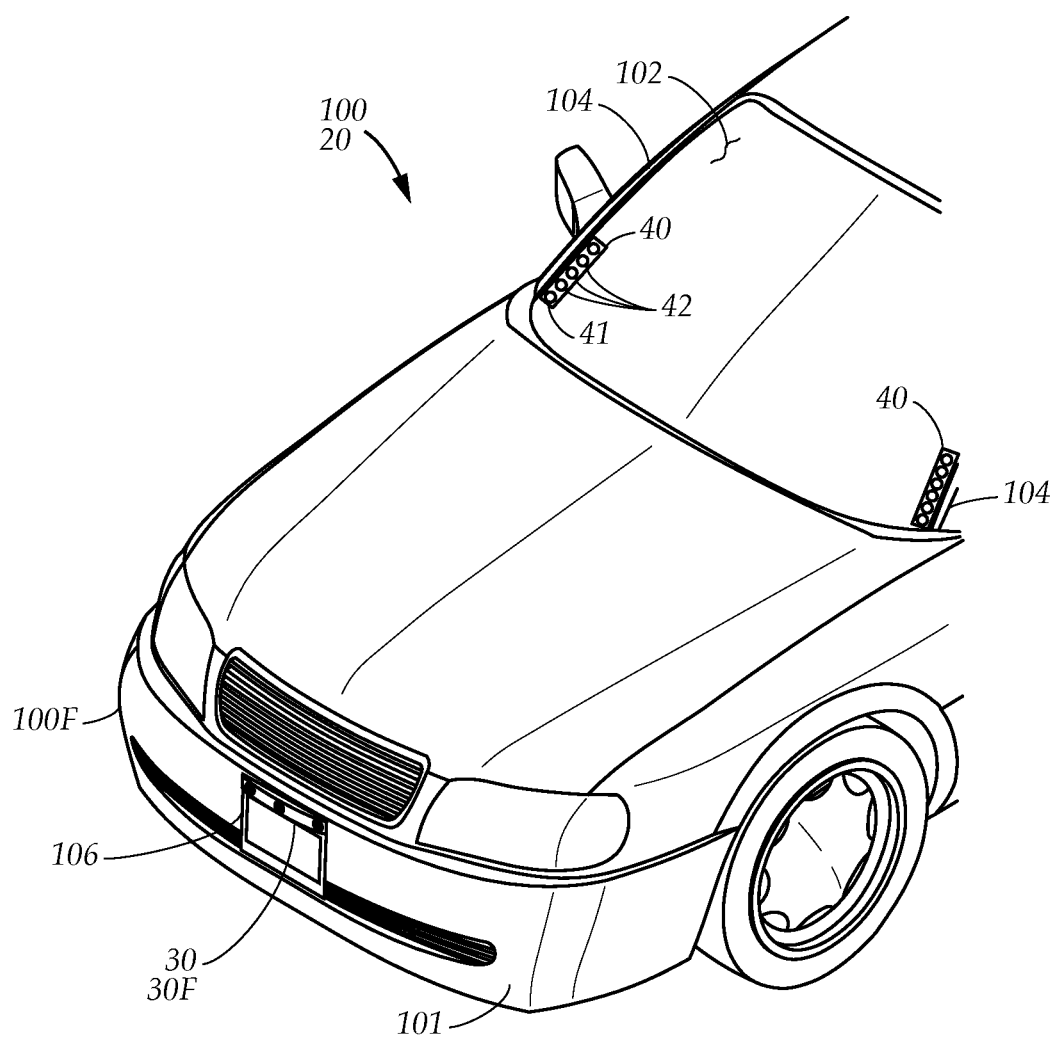
FIG. 1 is diagrammatic perspective view, showing a primary vehicle having a sensor bar installed at the front bumper, and an indicator bar installed in the front windshield, in accordance with the principles of the present disclosure.

FIG. 1 illustrates a primary vehicle 100, having a vehicle proximity warning system 20 installed therein. The primary vehicle 100 has a front 100F, including a front bumper 101 and a front windshield 102 that is bordered by windshield pillars 104. A front license plate frame 106 is located at the front 100F, near or on the front bumper 101. Seen in FIG. 1, the vehicle proximity warning system 20 includes a sensor bar 30, in particular a front sensor bar 30F, and a pair of indicator bars 40. In the example illustrated in FIG. 1, the sensor bar 30 is attached to or incorporated within the license plate frame 106, and the indicator bars 40 are located on the front windshield 102, adjacent to the windshield pillars 104. The indicator bars 40, each include a plurality of distance indicator LEDs 42 that are individually addressable. The indicator bars 40 may each comprise a translucent cylindrical tube 41 that includes the indicator LEDs 42 axially spaced therein, such that when the indicator LEDs 42 within one of the indicator bars 40 are illuminated, it can be seen from various positions around the indicator bar 40. Thus, the indicator bar 40 located along the front windshield 102 can be seen from both inside and outside of the primary vehicle 100. Note that the indicator LEDs 42 in the indicator bar 40 located near the front windshield 102 are preferably colored amber rather than red, to avoid being mistaken for brake lights by other vehicles.

Figure 2:
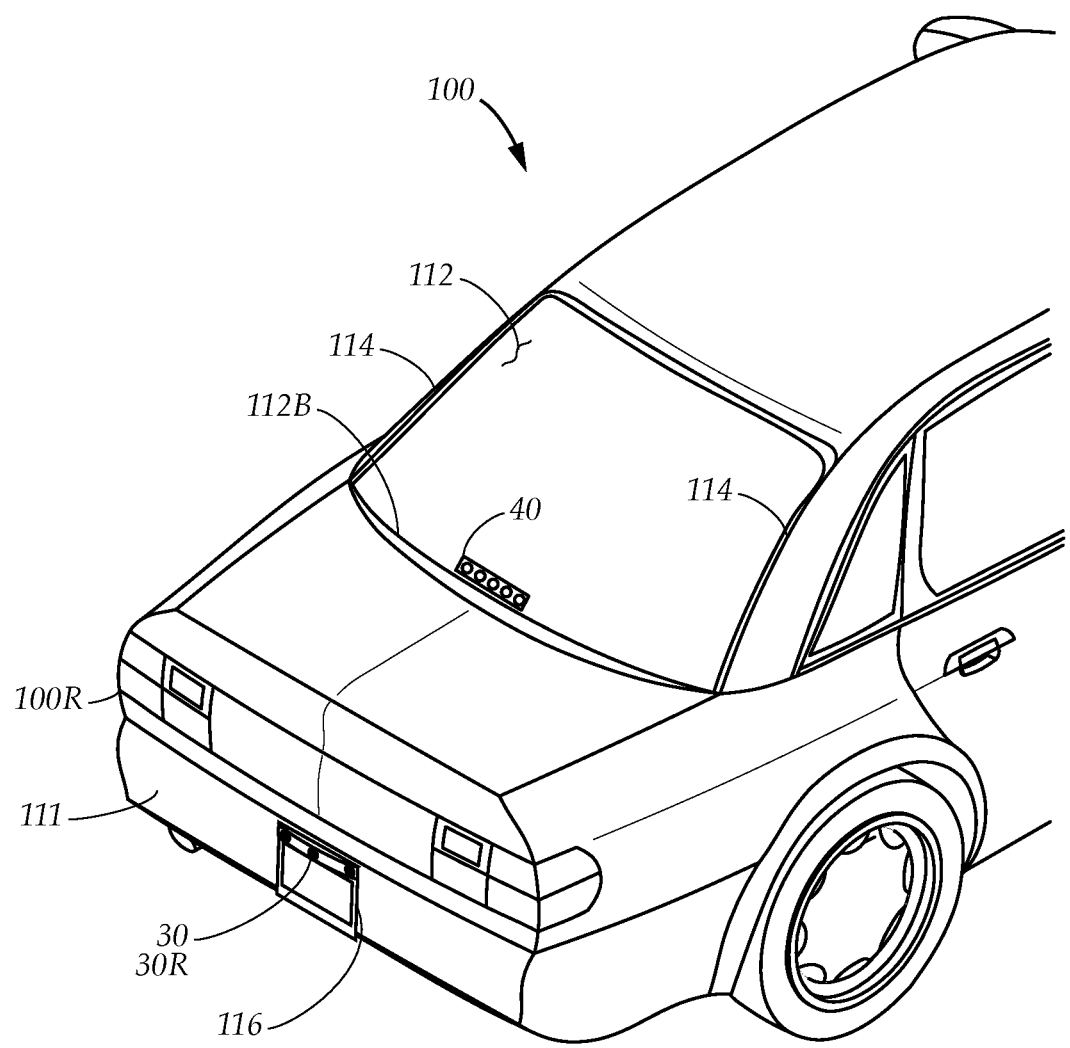
FIG. 2 is a diagrammatic perspective view, showing the primary vehicle having a sensor bar installed at the rear bumper, and an indicator bar installed in a rear window.

Referring to FIG. 2, the primary vehicle 100 also has a rear 100R, including a rear bumper 111 and a rear window 112 that has a rear window bottom 112B and is bordered by rear window pillars 114. A rear license plate frame 116 is located at the rear 100R, near the rear bumper 111. In the example illustrated in FIG. 1, the sensor bar 30 is a rear sensor bar 30R, and is attached to or incorporated within the rear license plate frame 116, and the indicator bar 40 is located on the rear window 112, adjacent to the rear window bottom 112B. FIG. 2 thereby shows an example where only one indicator bar 40 is employed at the rear window 112. Note that the indicator bar 40 may also be provided in pairs and positioned adjacent to the rear window pillars 104, or at any other highly visible, suitable location where they can be seen from both inside and outside of the primary vehicle 100.

Figure 3:
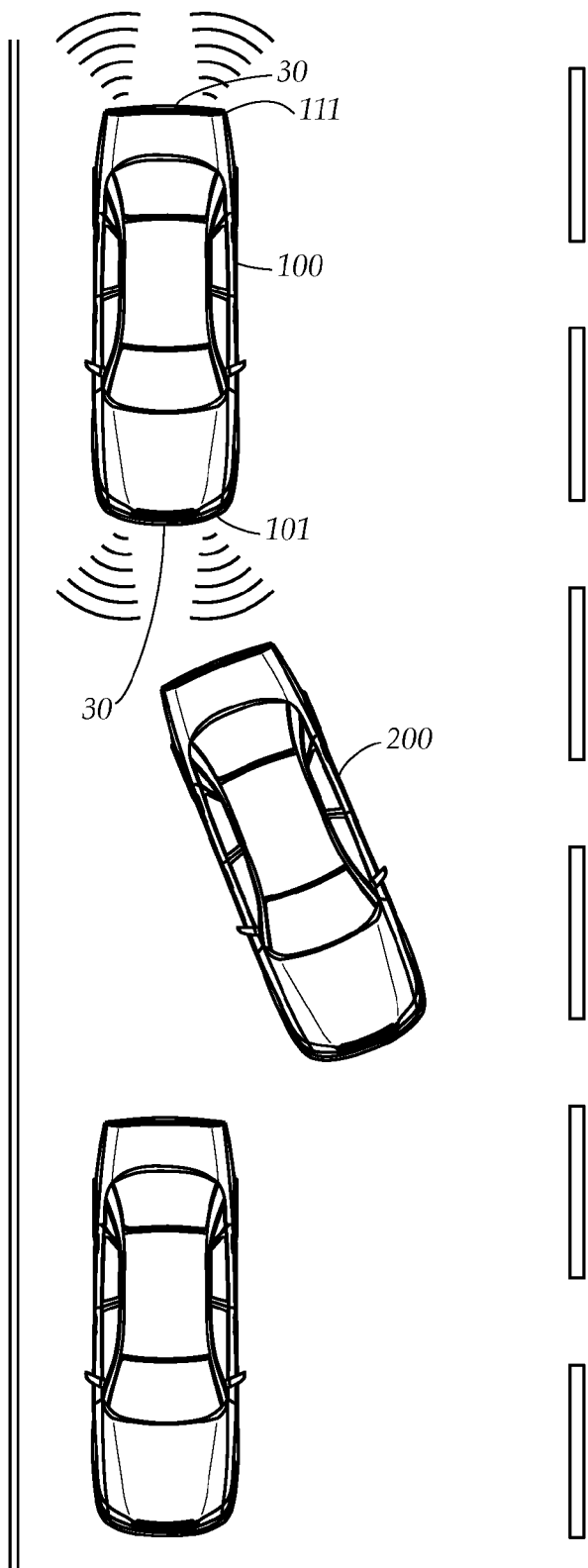
FIG. 3 is a top plan view, illustrating a secondary vehicle approaching the primary vehicle while parking.

Referring to FIG. 3, when the sensor bars 30 are active, such as when the primary vehicle 100 is parked, they continually measure and determine a proximity distance with large objects in front of and behind the primary vehicle 100. Accordingly, when a secondary vehicle 200 approaches, the proximity distance detected will reflect an actual distance between the secondary vehicle 200 and one of the bumpers 101, 111 of the primary vehicle 100.

Figure 4A:
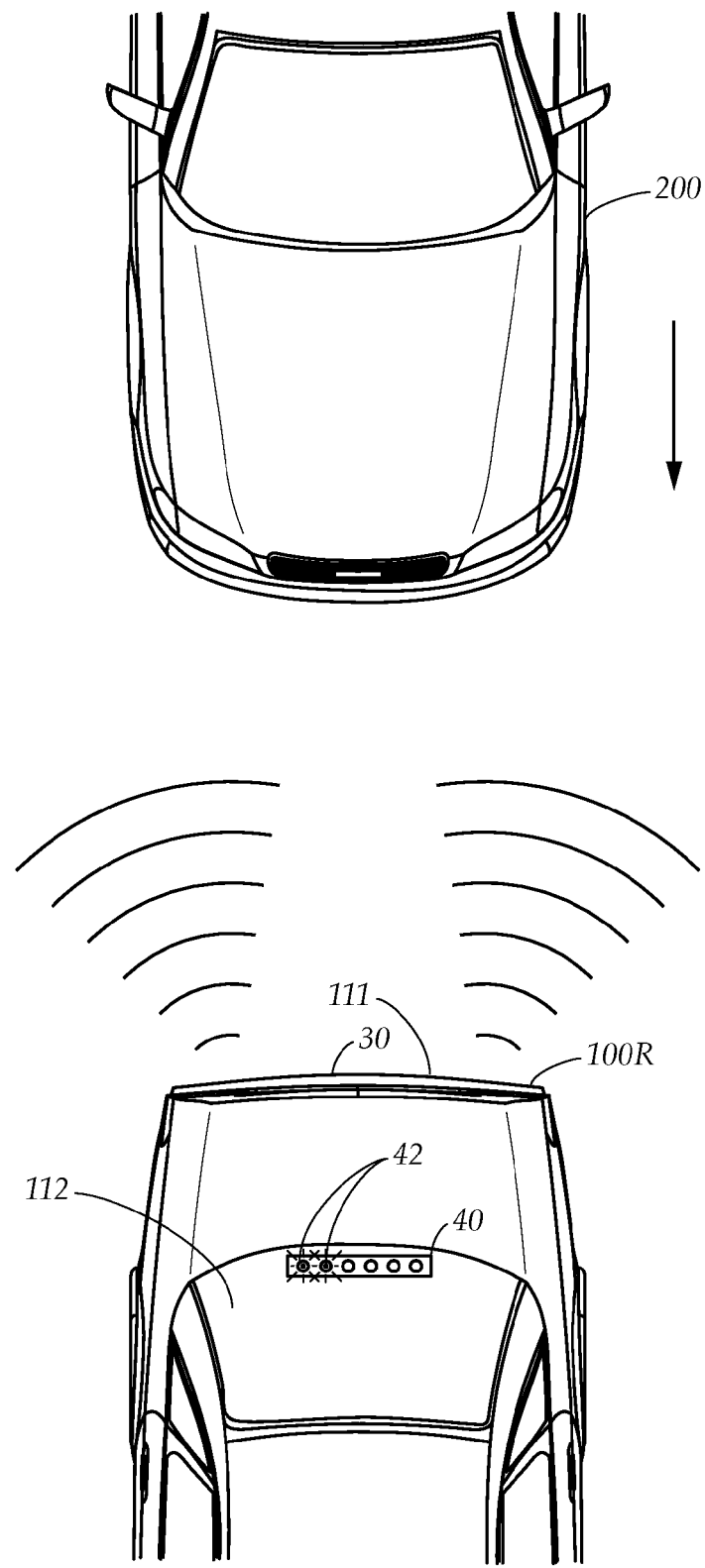
FIG. 4A is a top plan view, illustrating the secondary vehicle approaching the primary vehicle, wherein the indicator bar is partially illuminated.
Figure 4B:
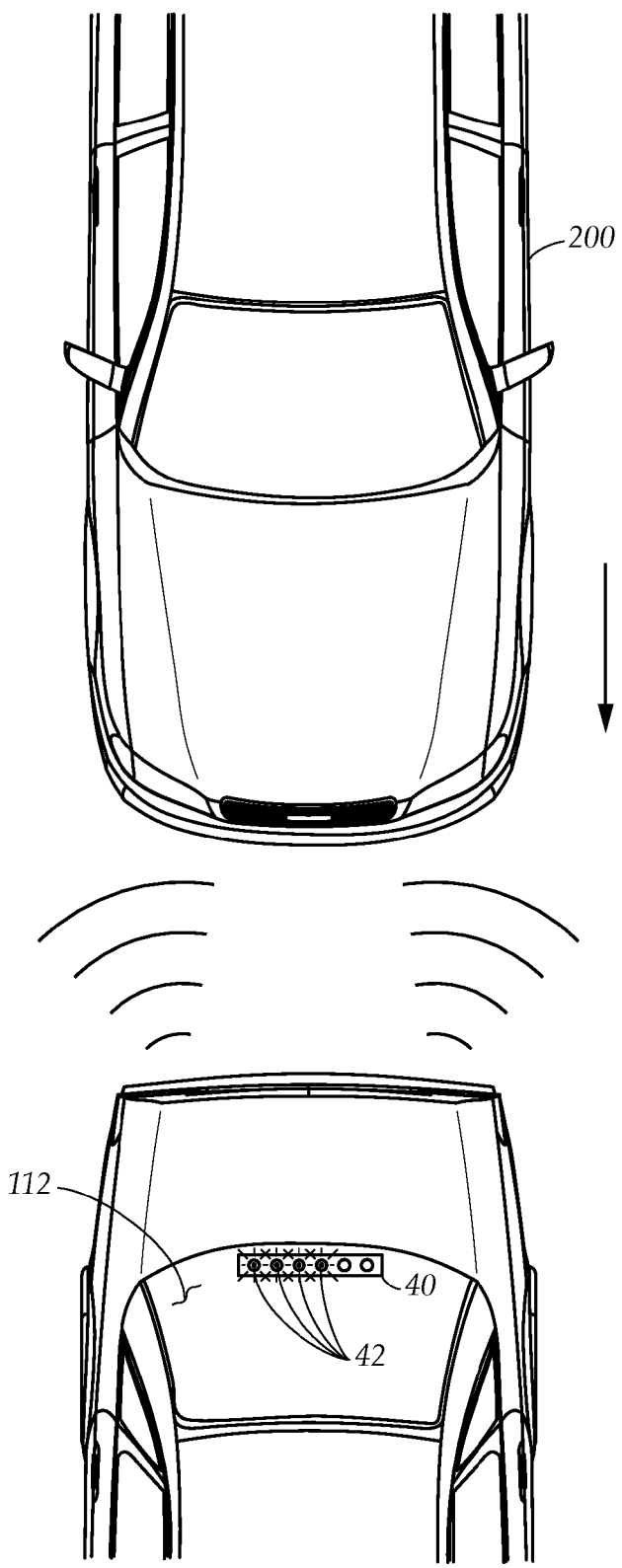
FIG. 4B is a top plan view, similar to FIG. 4A, except wherein the secondary vehicle is closer to the primary vehicle, and the indicator bar is increasingly illuminated.

Referring to FIG. 4A, the secondary vehicle 200 is approaching toward the rear 100R of the primary vehicle 100. The sensor bar 30 near the rear bumper 111 determines the proximity distance between the rear bumper 111 and the secondary vehicle 200. In accordance with the proximity distance thus detected, two of the distance indicator LEDs 42 are activated in the indicator bar 40 in the rear window 112 of the primary vehicle 100, where they can be seen from both inside and outside the primary vehicle 100. As shown, the distance indicator LEDs 42 are plainly visible to the secondary vehicle 200 as it approaches the rear bumper 111 of the primary vehicle 100, and thereby provides a visual indication to the secondary vehicle 200 that warns of the decreasing distance to the primary vehicle 100. Accordingly, in FIG. 4B the secondary vehicle 200 has continued approaching and is now closer. Since the proximity distance detected by the primary vehicle 100 has decreased, more distance indicator LEDs 42 are lit to warn of the closing space between the vehicles. In fact, four of the distance indicator LEDs 42 are activated in the indicator bar 40 in the rear window 112 of the primary vehicle 100. As the distance decreases, even more distance indicator LEDs 42 will be illuminated until all are lit, and then until a predetermined danger threshold has been reached, at which point all distance indicator LEDs 42 may be flashed, as will be described further hereinbelow.

Figure 5:
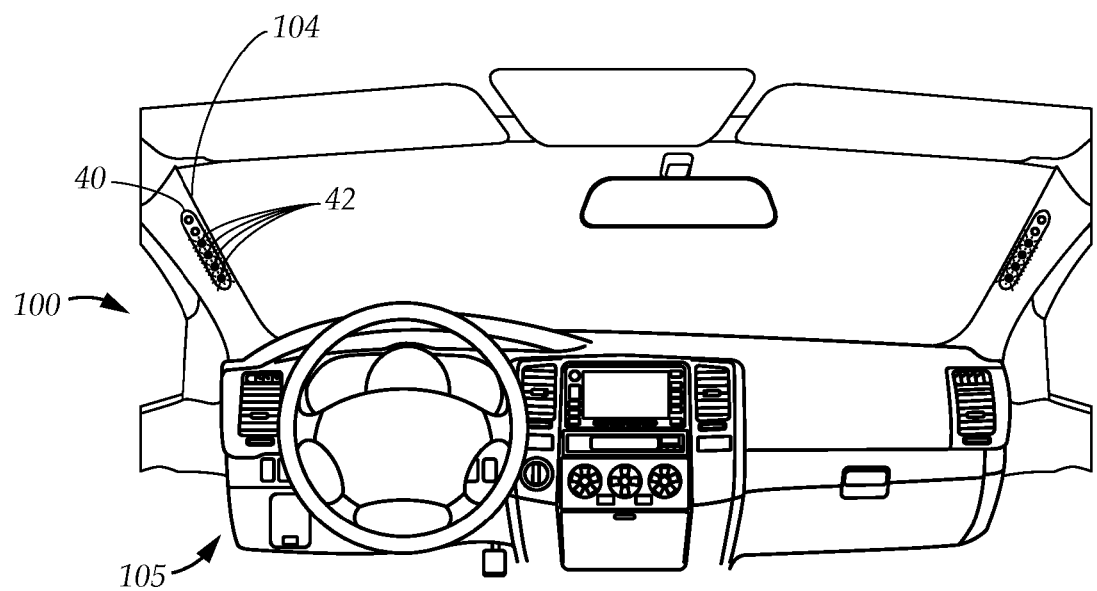
FIG. 5 is a diagrammatic perspective view, illustrating a vehicle interior.

FIG. 5 shows an interior 105 of the primary vehicle 100. Note that in this embodiment, the indicator bars 40 are mounted on the windshield pillars 104 immediately adjacent to the front windshield 102. Accordingly, the indicator bars 40 and their associated distance indicator LEDs 42, can be readily seen by both a driver/owner/operator of the primary vehicle 100 seated within the vehicle interior 105, as well as by other vehicles, outside the primary vehicle 100, as they approach.

Figure 7:
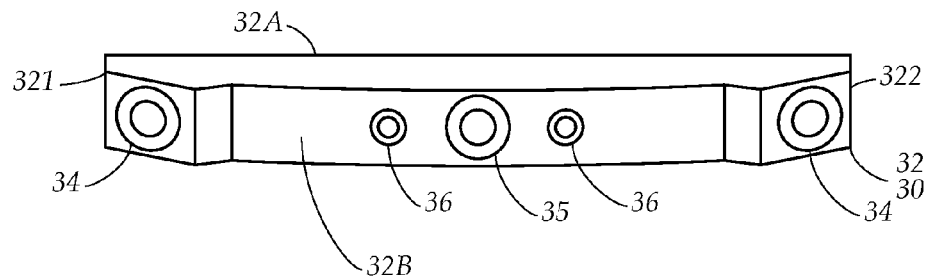
FIG. 7 is a diagrammatic perspective view, showing an example embodiment of the sensor bar in accordance with principles of the present disclosure.

Referring now to FIG. 7, each sensor bar 30 has a housing 32 having a vehicle mounting side 32A and an opposite, outward side 32B. The housing 32 has a first end 321 and a second end 322. A pair of proximity sensors 34 are located on the outward side 32B, one at each of the ends 321, 322. A camera 35 is located substantially centrally between the ends 321, 322. A pair of illumination LEDs 36, flank the camera 35, wherein one of the illumination LEDs 36 is located adjacent to the camera 35 toward the first end 321 and the other is located adjacent to the camera 35 toward the second end 322. The sensor bar 30 may also have a sound transducer, which may be a piezo transducer or other annunciator, for generating a loud sound in the immediate vicinity of the sensor bar 30 when activated. The sensor bar 30 can be constructed to mount to vehicles in a variety of different ways, including mounting to a license plate frame, being incorporated into a license plate frame, and adhesive attachment to suitable vehicle components. In general, the mounting side 32A is attached to the vehicle, and the outward side 32B faces forwardly if at the front of the vehicle, or rearwardly if at the rear of the vehicle.

Figure 8:
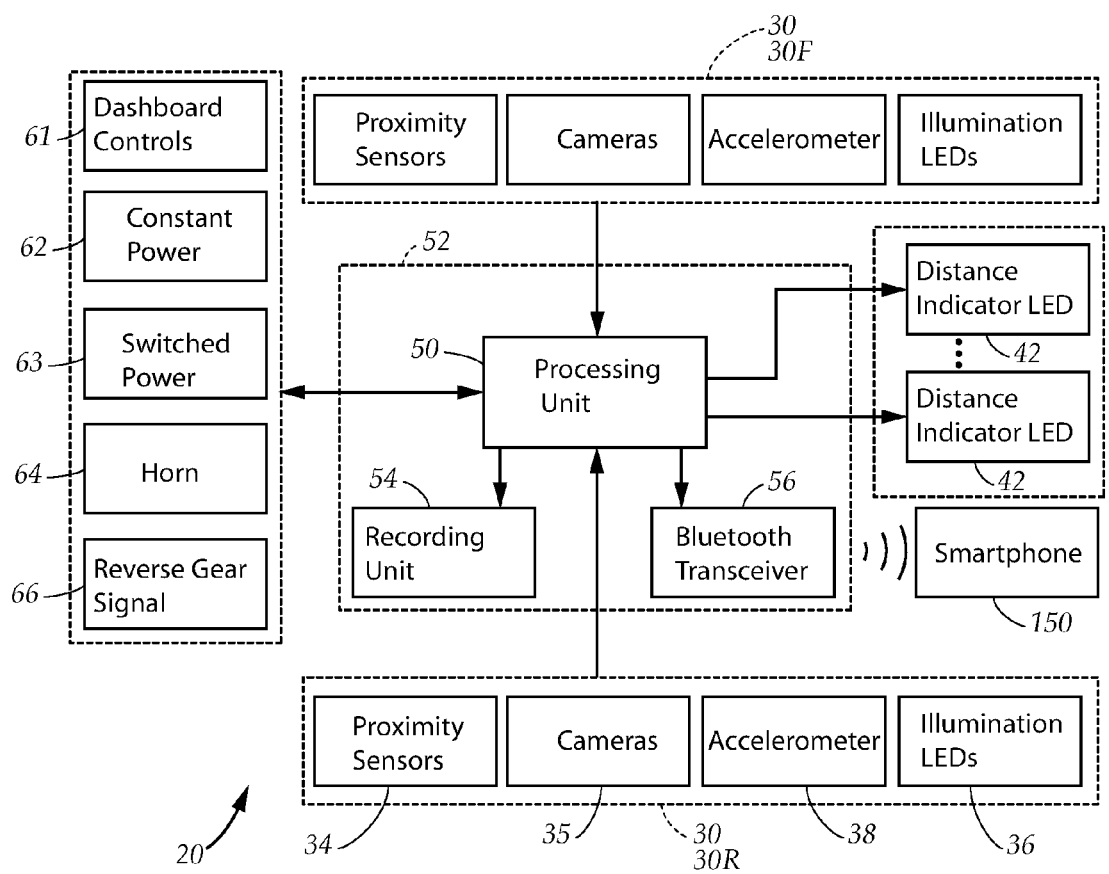
FIG. 8 is a block diagram, illustrating functional interconnection of various components of the system in accordance with principles of the present disclosure.

Referring to FIG. 8, in addition to the proximity sensors 34, the camera 35, and the illumination LEDs 36, each sensor bar 30 includes an accelerometer 38. The vehicle proximity warning system 20 has a processing unit 50 which is in communication with each of the sensor bars 30, and is capable of receiving data from the proximity sensors 34, camera 35, and accelerometer 38, and is capable of selectively enabling and disabling the illumination LEDs 36 in accordance with their desired functionality, as will be described in further detail hereinbelow. Thus, each sensor bar 30 may also contain its own microcontroller, or other suitable device for facilitating wired or wireless communication with the processing unit 50. The processing unit 50 is also in communication with the distance indicator LEDs 42, and is capable of individually enabling each distance indicator LED 42 to appropriately indicate a proximity distance as determined by the sensor bars 30, as will be described in more detail hereinbelow.

Figure 6:
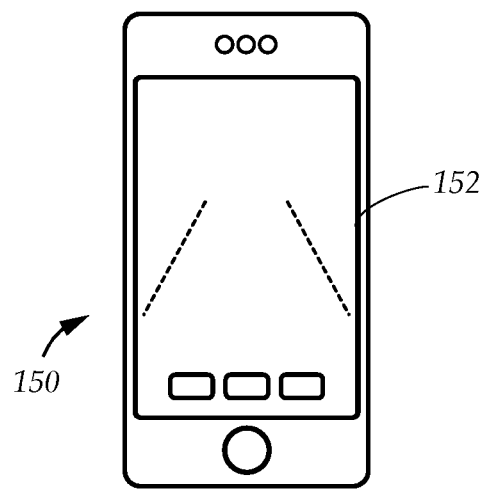
FIG. 6 is a front elevational view, illustrating a smartphone operating in conjunction with the system.

While the grouping of components may be varied while adhering to the functionality described herein, FIG. 8 illustrates an exemplative grouping of components. The processing unit 50 may be contained within a main unit 52. The main unit 52 may be centrally located within the vehicle, such as at, under, of within the dashboard. Also within the main unit 52 is a recording unit 54 and a Bluetooth wireless data transceiver 56, both connected to the processing unit 50. The recording unit 54 includes computer memory and any backup power source necessary to provide non-volatile storage of data received from the sensor bars 30, namely, image data from the camera 35, and collision event data from the accelerometer 38. The Bluetooth wireless data transceiver 56 is capable of coupling with a smartphone 150 associated with the primary vehicle and it's owner/operator, and wirelessly transmitting and receiving data therewith. FIG. 6 illustrates the smartphone 150 associated with the primary vehicle, in particular it's owner/operator. The smartphone 150 has a touchscreen display 152. The smartphone 150 runs an application that facilitates and interfaces with functionality provided by the vehicle proximity warning system. In particular, the smartphone is capable of receiving wireless data transmissions from the system, as will be described hereinafter. Accordingly, the application may be configured to provided such features as receiving image and event data recorded by the system, vibrating or sounding an alert in response to the proximity distance detected, and even streaming the cameras 35 (FIG. 8) to the touchscreen to facilitate safe operation/parking of the primary vehicle.

Referring again to FIG. 8, when installed within the primary vehicle 100, the main unit 52 is connected to various vehicle components 60, which may include dashboard controls 61, a constant power connection 62, a switched power connection 63, a horn control 64, and a reverse gear signal 66. Among these, it should be noted that the switched power connection 63 is active when vehicle ignition is on, and that the reverse gear signal 66 is active when the vehicle transmission is in reverse. Thus, the switched power connection 63 and reverse gear signal 66 can be used by the processor 50 for reliably determining when the ignition is on, and when the vehicle is in reverse.

Figure 9:
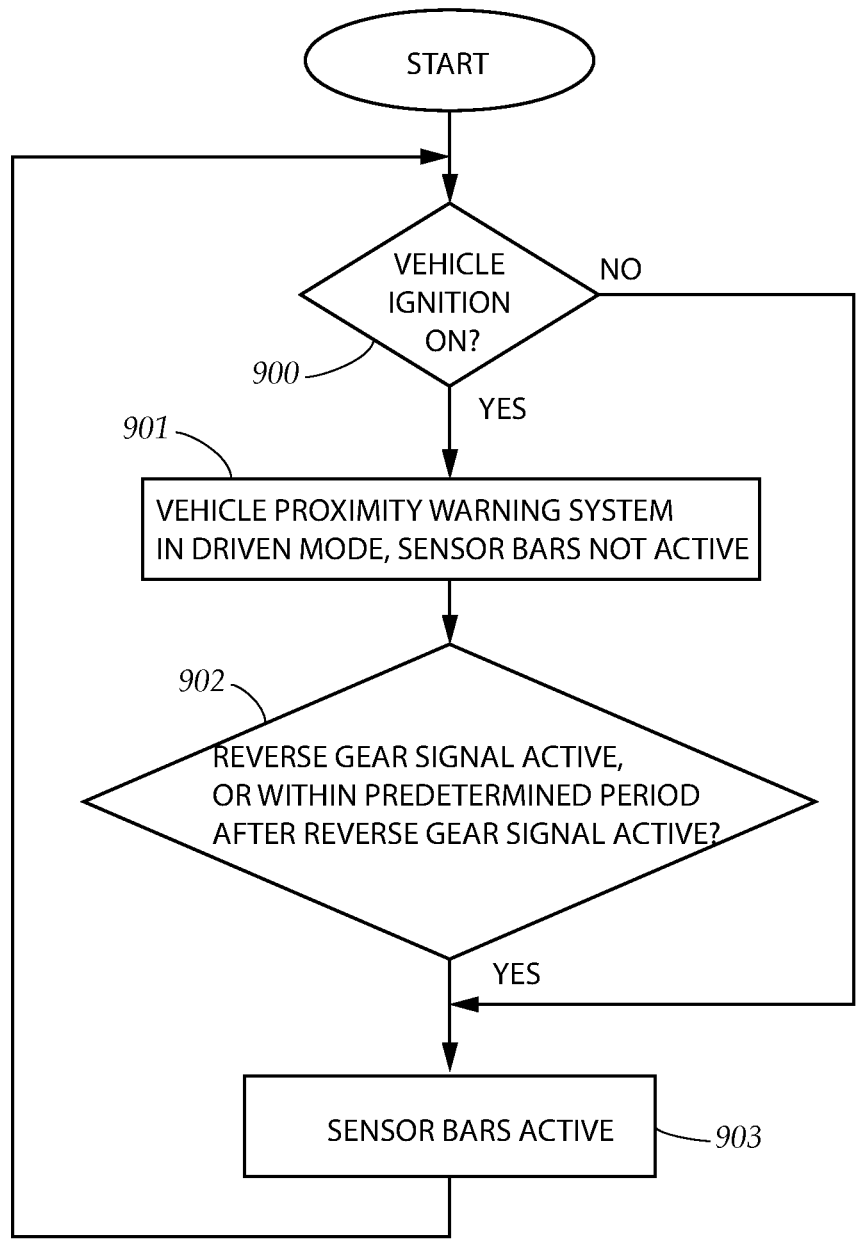
FIG. 9 is a flow diagram, illustrating functional modes of operation of the system in determining when the sensor bars are active.

Referring to FIG. 9, by checking whether the switched power connection is active, the system determines when the vehicle ignition is on 900, and accordingly places the vehicle proximity warning system in its driven mode, such that the sensor bars are not active 901. If the ignition is not on, the system is in the parked mode, and the sensor bars are made active 903. While in the driven mode, it is determined whether the reverse gear signal is active, or whether it was active within a predetermined period 902. If the reverse gear signal is indeed active or had just been active within a predetermined period, the sensor bars are made active 903. Accordingly, when a driver of the primary vehicle begins parking by placing the vehicle in reverse, the sensor bars are active, and will remain active for a predetermined period, such as twenty to sixty seconds, so that they will function even while the vehicle is in a forward gear, since the vehicle is likely still engaged in a parking maneuver.

Figure 10:
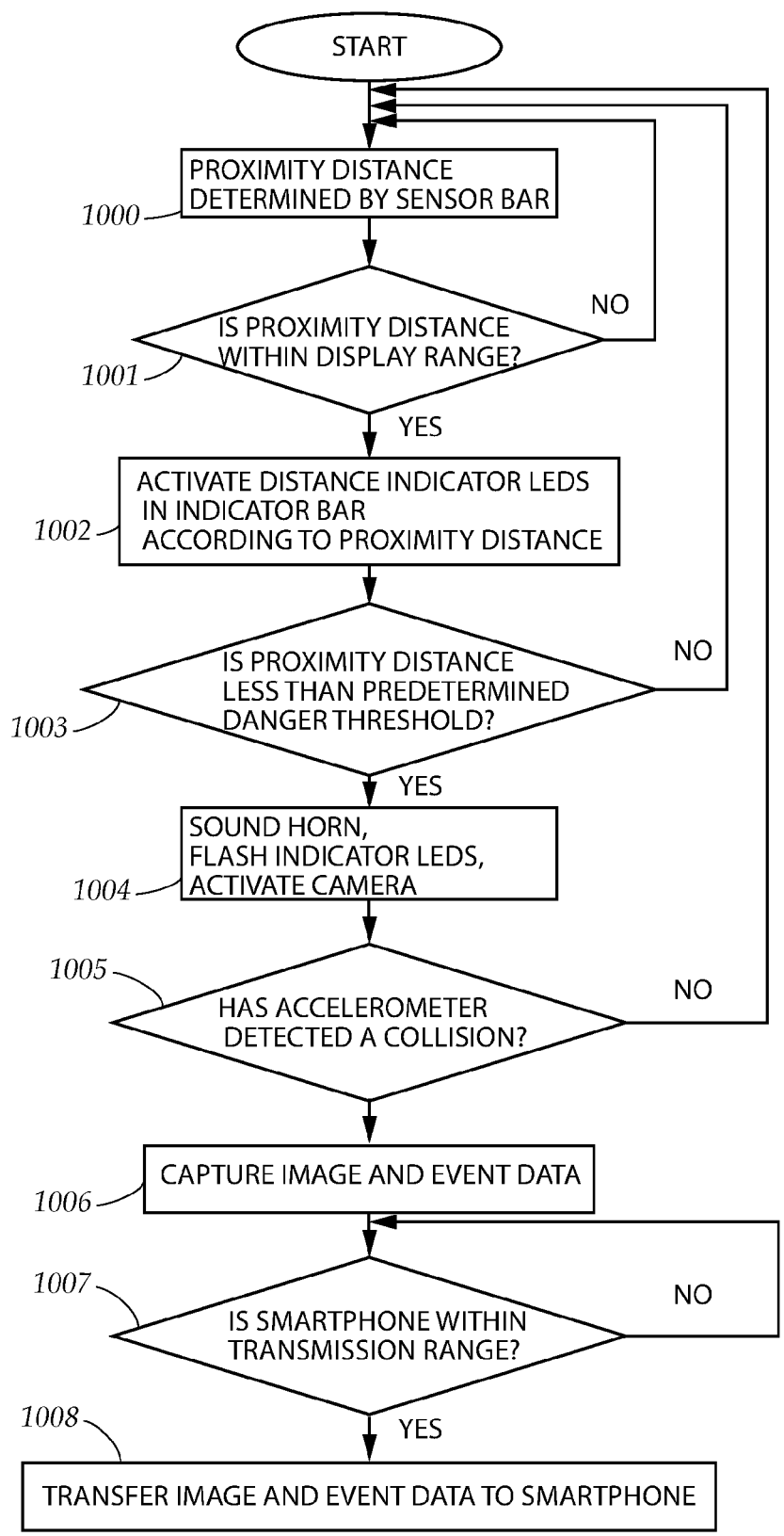
FIG. 10 is a flow diagram, illustrating operational steps when the sensor bars are active.

Referring to FIG. 10, operation of the system when the sensor bars 30 are active is indicated, with periodic numeric reference of system components referring to the block diagram of FIG. 8. In particular, proximity distance is determined by each sensor bar 1000. Then the processor 50 determines whether the proximity distance is within a display range 1001. Generally, the display range is a distance that has been predetermined as being appropriate for beginning to illuminate the distance indicator LEDs 42. Such a distance is preferably five to ten feet, which is a distance that is generally predictive that the secondary vehicle is approaching, and likely to get quite close to the primary vehicle. Then, the processor 50 will activate distance indicator LEDs 42 in the indicator bar according to the proximity distance 1002. The number of distance indicator LEDs lit is appropriately calibrated or scaled to reflect a decreasing proximity distance with each additional LED activated/lit. For example, a proximity distance of 10 feet might result in one distance indicator LED 42 illuminated, while a proximity distance of 3 feet might result in three distance indicator LEDs 42 illuminated, etc. Accordingly, initially a single distance indicator LED will be activated when the proximity distance falls just below the display range. Also, generally the distance indicator LEDs 42 that are illuminated are in the indicator bars 40 near the sensor bars 30. Accordingly the indicator bar 40 located in the front windshield is associated with and responsive to the proximity distance detected by the front sensor bar 30F. Next, it is determined whether the proximity distance is less than a predetermined danger threshold 1003. The predetermined danger threshold is a distance that indicates that there is a significant danger that the secondary vehicle and primary vehicle may collide. For example, the predetermined danger threshold might be set as a distance between six inches and two feet. If the proximity distance is not less than the predetermined danger threshold 1003, then, as the proximity distance is continually determined by the sensor bar 1000, the processor will continue to activate distance indicator LEDs as appropriate for the proximity distance 1002. When it is determined that the proximity distance is less than the predetermined danger threshold 1003, the processor sounds an alert, flashes the distance indicator LEDs, and activates the camera 1004. Note that the alert may be sounded by activating the vehicle horn 64 and/or through activating sound transducers in the sensor bar(s). Note that the alert may be discontinued after a time if no change in proximity distance is detected. If the Accelerometer detects a collision 1005, however, images are captured/recorded, as well as event data reflecting the occurrence of a collision 1006. The camera 35 is likely continually conveying image data to the processor 50, which may include still images and video, prior to the collision, and such data is continually buffered such that upon the occurrence of the collision, the buffered data for a short time before the collision is then stored by the processor in the recording unit 54 in correlation with the collision event data. Once the collision event has been detected 1005 and the image and event data is recorded 1006, the processor will determine whether the smartphone is within range of the wireless transceiver 1007. When the Bluetooth wireless data transmission protocol is used, typically this range is approximately thirty feet. When the smartphone 150 is within range or when it returns to range, the smartphone 150 would "pair" to establish a connection with the wireless data transceiver 56. If the smartphone 150 is detected as being within range, the image and event data regarding the collision may be automatically transferred to the smartphone 1008.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a vehicle proximity warning system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A vehicle proximity warning system, installed within a primary vehicle having a front and rear, a front windshield toward the front, a rear window toward the rear, and a front and rear bumper, for warning of the approach of a secondary vehicle, comprising:

at least one sensor bar, located near one of the bumpers of the primary vehicle, the sensor bar adapted for detecting a proximity distance of the secondary vehicle with respect to said bumper, the sensor bar having a camera adapted for acquiring images of the secondary vehicle and an accelerometer for detecting collision with said bumper;

at least one indicator bar, the indicator bar having a plurality of distance indicator LEDs, the indicator bar located in the primary vehicle in the one of the front windshield and rear window that is closest to the bumper having the sensor bar so that the indicator bar and its distance indicator LEDs are visible to the secondary vehicle when near said bumper;

wherein each sensor bar has at least one illumination LED next to the camera on said sensor bar, the illumination LED is activated to facilitate image capture by the camera when the proximity distance to the sensor bar is below a predetermined distance;

a smartphone, and a wireless data transceiver in communication with the processing unit for communicating images and data acquired by the processing unit from one of the sensor bars to the smartphone; and a processing unit, for individually activating the distance indicator LEDs in the sensor bar, wherein more distance indicator LEDs are activated as the proximity distance decreases, and adapted for acquiring and storing images of the secondary vehicle from the camera when the proximity distance is below a predetermined threshold and when the accelerometer detects a collision with the bumper.

2. The vehicle proximity warning system as described in claim 1, wherein the at least one sensor bar further comprises front and rear sensor bars, the front sensor bar located at the primary vehicle front and the rear sensor bar located at the primary vehicle rear, and wherein the at least one indicator bar, comprises indicator bars located near the front windshield and rear window of the primary vehicle.

3. The vehicle proximity warning system as described in claim 2, wherein the primary vehicle has a constant power connection, a switched power connection, and a reverse gear signal; wherein the processing unit is connected to the switched power connection, and wherein the processing unit automatically enters a parked mode when the switched power connection is active, and automatically enters a driven mode when the switched power connection is not active, such that in the parked mode both sensor bars and their associated indicator bars are active, and in the driven mode the sensor bars at the primary vehicle rear and primary vehicle front are normally deactivated but are activated for a predetermined time after the reverse gear signal is active.

4. The vehicle proximity warning system as recited in claim 1, wherein each sensor bar has a housing having a first end, a second end, an outward side and a vehicle mounting side, one of its proximity sensors is located near the first end, the other proximity sensor located near the second end, the camera is substantially centered between the first end and second end, and the at least one illumination LED is located alongside the camera.

5. A vehicle proximity warning system, installed within a primary vehicle having a front and rear, a front windshield toward the front and bordered by windshield pillars, a rear window toward the rear, and a front and rear bumper, for warning of the approach of a secondary vehicle, comprising:
 a pair of sensor bars, including a first sensor bar located near the front bumper of the primary vehicle and a second sensor bar located near the rear bumper of the primary vehicle, each sensor bar adapted for detecting a proximity distance of the secondary vehicle with respect to said bumper, each sensor bar having a camera adapted for acquiring images of the secondary vehicle and an accelerometer for detecting collision with said bumper;
 at least two indicator bars, each indicator bar having a plurality of distance indicator LEDs, at least one of the indicator bars located in the front windshield along one of the windshield pillars and at least one of the indicator bars located in the rear window so that each indicator bar and its distance indicator LEDs are adapted to be visible to the secondary vehicle when it approaches one of the front bumper and the rear bumper;
 wherein each sensor bar has at least one illumination LED next to the camera on said sensor bar, the illumination LED is activated to facilitate image capture by the camera when the proximity distance to the sensor bar is below a predetermined distance;
 a smartphone, and a wireless data transceiver in communication with the processing unit for communicating images and data acquired by the processing unit from one of the sensor bars to the smartphone; and
 a processing unit, for individually activating the distance indicator LEDs in the sensor bar, wherein more distance indicator LEDs are activated as the proximity distance decreases, and for acquiring and storing images of the secondary vehicle from the camera when the proximity distance is below a predetermined threshold and when the accelerometer detects a collision with the bumper.

6. The vehicle proximity warning system as recited in claim 5, wherein each sensor bar has a housing having a first end, a second end, an outward side and a vehicle mounting side, one of its proximity sensors is located near the first end, the other proximity sensor located near the second end, the camera is substantially centered between the first end and second end, and the at least one illumination LED is located alongside the camera.

7. The vehicle proximity warning system as recited in claim 6, wherein the primary vehicle has a constant power connection, a switched power connection, and a reverse gear signal; wherein the processing unit is connected to the switched power connection, and wherein the processing unit automatically enters a parked mode when the switched power connection is active, and automatically enters a driven mode when the switched power connection is not active, such that in the parked mode both sensor bars and their associated indicator bars are active, and in the driven mode the sensor bars at the primary vehicle rear and primary vehicle front are normally deactivated but are activated for a predetermined time after the reverse gear signal is active.

8. A vehicle proximity warning method, for warning of the approach of a secondary vehicle to a primary vehicle, the primary vehicle having front and rear bumpers, a front windshield, a rear window, and indicator bars in the front windshield and rear window that each have distance indicator LEDs, and sensor bars at the front and rear bumpers that each have proximity sensors and a camera,
 comprising the steps of:
 determining a proximity distance between the sensor bar and the secondary vehicle;
 providing a warning display visible to the secondary vehicle by illuminating at least one distance indicator LEDs as the proximity distance falls below the display range and illuminating more distance indicator LEDs as the proximity distance decreases;
 activating the camera when the proximity distance is less than a predetermined danger threshold;
 capturing and recording images of the secondary vehicle from the camera when the accelerometer detects a collision;
 wherein each sensor bar has at least one illumination LED next to the camera on said sensor bar, the illumination LED is activated to facilitate image capture by the camera when the proximity distance to the sensor bar is below a predetermined distance;
 wherein a smartphone is associated with the primary vehicle, and wherein the step of capturing and recording images from the camera when the accelerometer detects a collision is followed by the step of transmitting images and event data regarding the collision to the smartphone.

9. The vehicle proximity warning method as recited in claim 8, wherein the primary vehicle has a horn, and wherein the step of activating the camera further comprises flashing the distance indicator LEDs and activating the horn when the proximity distance is less than the predetermined danger threshold.

10. The vehicle proximity warning method as recited in claim 8, wherein the primary vehicle has a switched power connection and a reverse gear signal, wherein the step of determining a proximity distance is disabled when the switched power connection is active unless one of the reverse gear signals is active, and the reverse gear signal was active within a predetermined prior time period.

* * * * *